United States Patent [19]

Ronzani

[11] Patent Number: 4,944,453
[45] Date of Patent: Jul. 31, 1990

[54] HEATING SYSTEM

[76] Inventor: Artemio Ronzani, Frazione Clou N.6, 11010 Sarre (Aosta), Italy

[21] Appl. No.: 248,014

[22] Filed: Sep. 23, 1988

[51] Int. Cl.⁵ ............................................. F22B 35/00
[52] U.S. Cl. .................................. 237/8 R; 236/46 R
[58] Field of Search ................ 237/8 R, 56; 236/9 R, 236/9 A, 91 F, 91 E, 46 R, 46 F

[56] References Cited

U.S. PATENT DOCUMENTS 4,410,135 10/1983 Skyinskus ........................... 237/8 R
4,787,555 11/1988 Newell, III et al. .............. 236/46 R Primary Examiner—Henry A. Bennet
Attorney, Agent, or Firm—Sughrue, Mion, Zinn, Macpeak & Seas

[57] ABSTRACT

A heating system for buildings, comprising a boiler (12), a liquid circulation pump (28) and an electrical control panel (22), incorporates an electronic economizer device (26) arranged to make the circulation pump (28) operate intermittently according to cycles predetermined by the operator through timers (26a, 26b, 26c).

3 Claims, 2 Drawing Sheets

HEATING SYSTEM

DESCRIPTION

The present invention relates to a space heating system including a boiler with which are associated a burner, inlet and delivery pipes for the liquid, at least one liquid circulation pump, and an electrical control panel to which an ambient temperature sensor is connected.

Heating systems exist in which the rate of rotation or the output of the pump is variable in dependence on various operating paramaters of the heating installation. Such a heating system is described, for example, in the British Patent No. GB 2,068,601. This type of heating system, as well as being particularlY complex, does not allow high energy saving.

The object of the present invention is to provide a heating system which does not have these disadvantages and which is simple and economical to produce.

According to the invention, this object is achieved by virtue of the fact that the electrical control panel of the system is operatively associated with an electronic economiser device comprising a central processing unit provided with an input connected to a sensor of the temperature of the liquid in the boiler and an output connected to the pump, a first programmable timer arranged to determine the-duration of an operating cycle of the pump subject to the consent of the ambient temperature sensor and the boiler liquid temperature sensor, and a second programmable timer arranged to set the duration of a stop cycle of the pump independently of the temperature sensors.

By virtue of these characteristics, it is possible to maintain a more efficient thermal exchange in the boiler by virtue of the lower mean temperature of the liquid returning to the boiler. In other words, the radiators of the heating system are supplied with water at a higher temperature, while water at a lower temperature is supplied to the boiler in the various operating intervals of the pump cycle.

Further advantages and characteristics of the system according to the invention will become clear from the detailed description which follows, purely by way of non-limiting example, with reference to the appended drawings, in which.

Figure 1:
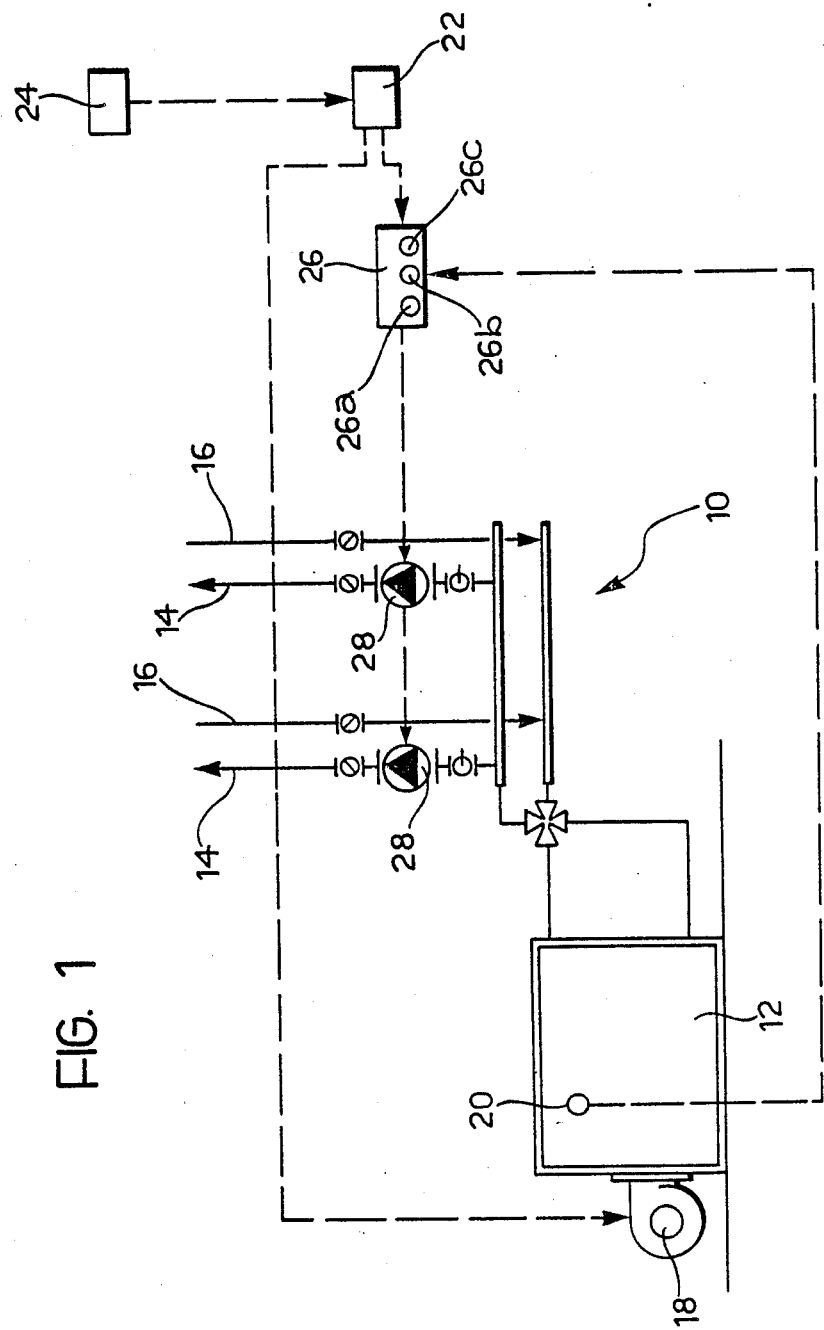
FIG. 1 is a schematic view of a heating system according to the invention.

With reference to the drawings, a heating system is generally indicated 10 and comprises a water circulation boiler 12 connected to liquid delivery pipes 14 and pipes 16 for the liquid returning from the radiators (not illustrated) situated in the space to be heated. A burner and a minimum temperature immersion thermostat 20 are associated with the boiler (12). The system 10 is provided with an electrical control panel 22 connected to an ambient temperature thermostat 24, to the burner 18 and, with the interposition of an electronic economiser device 26, to the liquid circulation pumps 28 situated in the delivery pipes 14.

In the operative configuration of the system 10, the operation of the circulation pumps 28 is controlled by means of the device 26 subject to the consent of both the minimum thermostat 20 of the boiler 12 and the ambient thermostat 24. The pumps 28 operate for a predetermined time set by means of a timer 26a of the economiser device 26, provided that the thermostats 20 and 24 consent thereto. At the end of this time interval, the pumps 28 are stopped by the device 26 and remain in this condition for a predetermined time set by means of a second timer 26b independently of the consent of the thermostats 20 and 24.

In order to allow running conditions to be reached rapidly when the system is cold or when the system has not been operating for a period greater than a predetermined time, the economiser device 26 is provided with a third timer 26c arranged to enable the operation of the circulation pumps 28 for a predetermined time greater than the time normally set by the first timer 26a. The operation of the pumps 28 during the transitory phase controlled by the third timer 26c is, however, conditional on the consent of the thermostats 20 and 24, the former not permitting the pumps to start if the temperature of the liquid in the boiler has not reached a certain value and the latter not permitting the pumps 28 (and at the same time the burner 18) to start if the ambient conditions do not require the system to be started.

The electronic economiser device 26 (FIG. 2) has a supply 30, a microprocessor 32, read-only and random-access memory devices 34, a parallel interface 36, a clock and addressing circuit 38, an input interface circuit 40 connected to the thermostats 20 and 24, and an output interface circuit 42 connected to the circulation pumps 28.

The supply 30 comprises a transformer, a rectifier, a stabilizer and a back-up battery. The microprocessor 32 is of the Z80 type, while the memory devices 34 are of EPROM 2732 and RAM 6116 types. The parallel interface 36 connected to the timers 26a, 26b, and 26c is of the Z80-Plo type.

Figure 2:
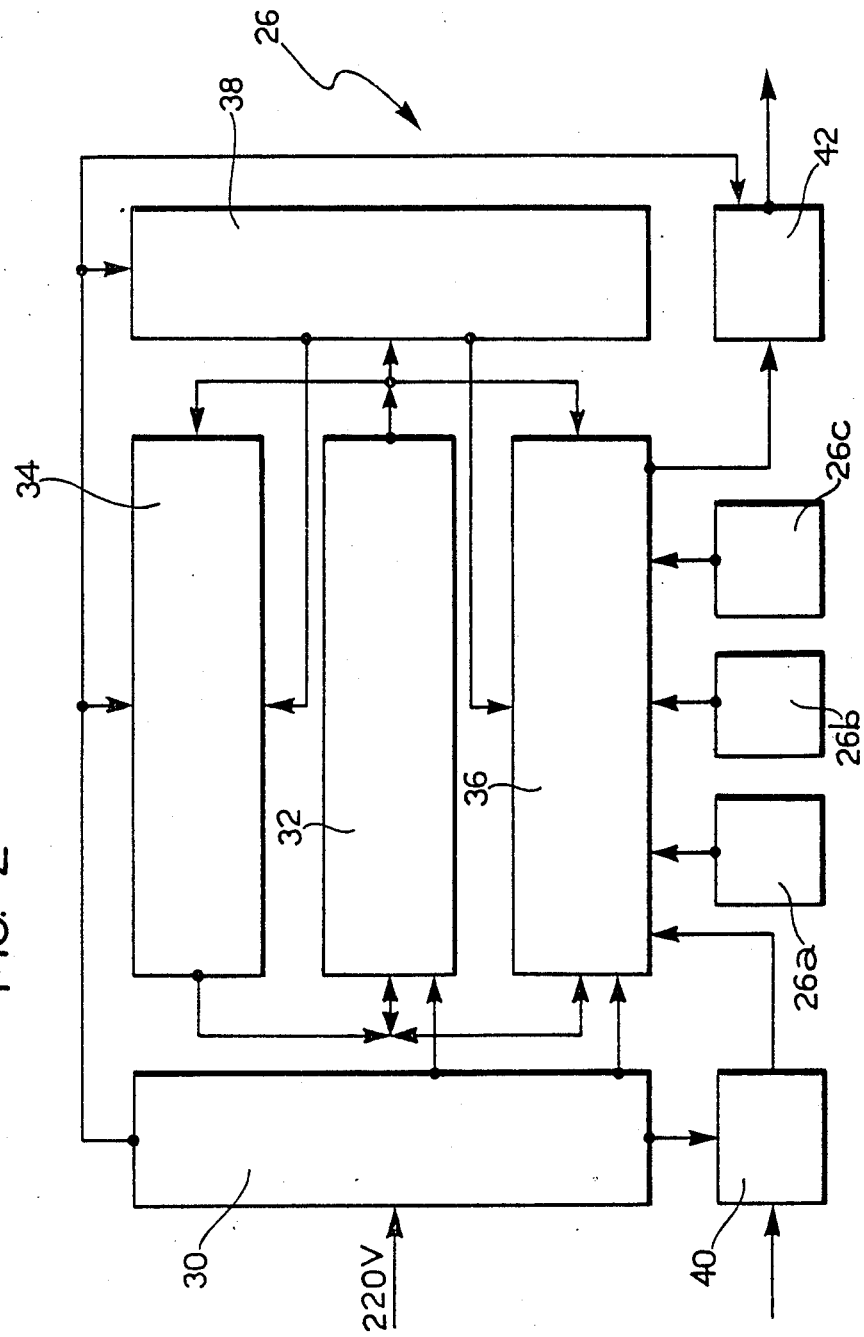
FIG. 2 is a block diagram of an electronic economiser device of the heating system of FIG. 1.

The components of the circuit of the electronic device 26 are connected to each other in the manner illustrated in FIG. 2.

In order better to understand the operation of the system according to the present invention, relative test data produced by a heating system according to the present invention are provided below.

EXAMPLE 1

A CTC-type boiler with a nominal output of 60,200 kilocalories/hour and 66,134 kilocalories/hour at the furnace was used in association with a Cuneod C10-type gas oil burner provided with a 4 kg/hour Monarch nozzle (45° C., supply pressure 13 Bars). A 32/22-type circulation pump produced by VEMA was used. The above boiler was serving a building of approximately 1400 cubic metres heated by means of a system of pipes and associated radiators and having a total of 513 litres of water in the system.

With water in the boiler at 80° C. and with the consent of the ambient thermostat 24, the circulation pump operated for a period of 9 minutes programmed by means of the third timer 26c. After the pump had operated for 2 minutes, the radiating bodies of the system were at 55° C. and the water in the boiler was at 45° C. In this condition, the minimum thermostat 20 of the boiler, set at 60° C., had already interrupted the operation of the circulation pump without switching off the timer 26c. In this intermediate phase, in which the circulation pump is not operating, the radiators are not cooled by the water coming from the boiler and the latter attains maximum temperature conditions again in approximately 5 minutes. The minimum temperature thermostat of the boiler and the third timer (like the first timer) cooperate with each other so that, if the set interval has not yet ended and the water is at a temperature lower than the value set by the minimum temperature thermostat 20 (for example 60° C.), the pump does not operate but starts again to complete the programmed interval as soon as the limit temperature set by the minimum temperature thermostat of the boiler has been reached. It was found that the circulation pump, in order to obtain a stable running temperature of approximately 55-60° C., had operated for the 9 minutes programmed and had required, in the various intervals during which the temperature in the boiler was lower than the minimum, approximately 25 minutes of operation of the burner.

The radiators of the sYstem used in the test (of cast iron) had taken 9-10 minutes to lose heat to the atmosphere and fall to a temperature of approximately 50° C. On the basis of this data, the second timer 26b was set at an 8-minute period of interruption of operation of the circulation pump. Subsequently, it was found that the pump had to operate for about 2 minutes to bring the temperature of the radiators back to 65° C. It was noted that a particular choice of duration of the intervals (a double cycle of 2 minutes of operation of the pump and 8 minutes of interruption) covered the thermal range from the maximum to the minimum temperature in the boiler provided for respectively by the maximum temperature thermostat (not illustrated) and the minimum temperature thermostat in the boiler.

The significant results obtained relating to the operation of the system for 24 hours with a mean external temperature of approximately −8° C. and an internal temperature of approximately 20° C. are as follows.

A total of 42 kg of gas oil was used with the circulation pump operating intermittently for a total of 4 hours.

EXAMPLE 2

(for comparison)

The same heating system was used as in Example 1, but without the electronic economiser device. In this configuration, a maximum temperature boiler thermostat was connected to the electrical control panel according to normal practice for installation and operation of heating systems.

A test day was chosen with an identical mean external temperature to that of Example 1.

A total of 74 kg of gas oil was used (24 hours) with the circulation pump operating for a total of approximately 19 hours and having a fuel consumption approximately 75% greater than that found using the economiser device (Example 1).

I claim:

1. A space heating system including a boiler with which are associated a burner, inlet and delivery pipes for the liquid, at least one liquid circulation pump, and an electrical control panel connected to at least one ambient temperature sensor, characterised in that an electronic economiser device (26) is operatively associated with the electrical control panel (22) and comprises:

a central processing unit provided with an input connected to a sensor (20) of the temperature of the liquid in the boiler (12) and an output connected to the pump (28);

a first timer (26a) connected to the pump to control the duration of an operating cycle of the pump (28) in conjunction with the temperatures sensed by the ambient temperature sensor (24) and the boiler liquid temperature sensor (20), and a second timer (26b) connected to the pump to control the duration of a non-operating cycle of the pump (28) independently of the temperature sensors (20,24).

2. A system according to claim 1, characterised in that the economiser device (26) includes an auxiliary timer (26c) connected to said pump to control the duration of operation of the pump (28) in an initial transitory heating phase, the room being cold, in conjunction with the temperature sensed by the ambient temperature sensor (24) and the boiler liquid temperature sensor (20).

3. A system according to claim 1, characterised in that the central processing unit of the economiser device (26) is arranged, each time the pump (28) is stopped by a signal from the temperature sensor (20) in the boiler, to memorise the operating time which has elapsed so as to enable the operating cycle controlled by the first timer (26a) or the third timer (26c) to be completed when the pump (28) is restarted.

* * * * *